UNITED STATES PATENT OFFICE 2,291,146

BOILER COMPOSITION

Ronald M. Buist, New Brunswick, and Meredith F. Parker, Long Branch, N. J.; said Parker assignor to said Buist No Drawing. Application January 18, 1939, Serial No. 251,528

1 Claim. (Cl. 252—80)

Our invention relates to what is generally referred to as boiler composition which is a substance added to water in a boiler to remove and prevent encrustation and corrosion of the interior of the boiler, thereby prolonging the life of the boiler and effecting greater efficiency of heat transfer and less fuel consumption.

Hardness of water is due principally to presence of calcium salts, such as calcium bicarbonate and calcium sulphate, and magnesium salts such as magnesium bicarbonate and magnesium sulphate, and in some localities ferrous bicarbonate. In boilers a hard scale of these salts is formed due to evaporation of feed water and changing of salts to less soluble form by heat. Such scale is a poor heat conductor and causes fuel waste which increases as the square of the scale thickness. Cracking of the brittle scale causes rapid corrosion and may result in explosive generation of steam or cracking of cast iron when water contacts overheated iron.

Many water softening substances and compositions have been proposed and used. It is a common practice to use both soda ash and lime. Trisodium phosphate is well known as a softener. There are boiler compounds of soda ash or sodium phosphate with tannic acid, starch, or a gummy material as a protective colloid. Borax is well known in softening laundry water. Sodium carbonate and trisodium phosphate have been used together in boiler compositions as have sodium carbonate and sodium tetraborate (borax).

The purpose of a boiler composition is to prevent deposition of a hard scale of the soluble salts by formation of loose insoluble substance which can occasionally be blown out. We have found that in the use of know boiler compositions it often occurs that the alkalinity of water is increased by the composition so that there results foaming and priming, and caustic embrittlement of the steel, or caustic action on valve seats, packing, and the like. We have also found that precipitated substances, even with protective colloids, form large lumps which are not easily removed, or settle, forming a hard cake in the bottom of the boiler. In overcoming these problems we have discovered a novel composition of substances each of which is well known in this art. Our composition comprises a water solution of seven percent sodium carbonate (soda ash), five percent trisodium phosphate, and three percent sodium tetraborate (borax). These proportions by weight may vary slightly. For instance, when used first in a "dirty" boiler in a slightly higher percentage of soda ash may be used to quickly take care of the accumulated soluble salts. If desired, about one percent of reducing sugar (for instance, black molasses) may be added, as known.

When this composition is used, the alkalinity remains substantially constant under all temperature conditions and even when greatly diluted and the precipitate is light and remains very fluocculent. The reasons for this are that upon increase in temperature alkalinity due to the sodium carbonate increases, but alkalinity due to the borax decreases, and they are proportioned so that the effects neutralize each other, while alkalinity due to the trisodium phosphate remains substantially constant. Further, the insoluble precipitate comprises a plurality of chemically different, heterogeneous substances which therefore tend to stay apart from each other or actually repel each other, and the general dispersion of these several substances prevents the formation of homogeneous lumps. We therefore accomplish chemically what others have attempted to accomplish mechanically by the addition to boiler composition of tannic acid, starch, gummy material, and even flaked graphite, silicates, or the like, and at the same time maintain a constant alkalinity (between 8.2 and 9.8) which does not endanger the boiler with caustic action.

What is claimed is:

A boiler composition which will maintain the alkalinity of boiler water substantially constant under all temperature conditions comprising a water solution of seven percent sodium carbonate, five percent trisodium phosphate and three percent sodium tetraborate by weight.

RONALD M. BUIST.
MEREDITH F. PARKER.